SEMI-CONDUCTOR COOLING MEANS

Filed Oct. 31, 1966 2 Sheets-Sheet 1

INVENTOR.
PETER G. ROSS
BY HIS ATTORNEY
Bertram Frank

Sept. 10, 1968 P. G. ROSS 3,400,543

SEMI-CONDUCTOR COOLING MEANS

Filed Oct. 31, 1966 2 Sheets-Sheet 2

INVENTOR.
PETER G. ROSS
BY HIS ATTORNEY
Bertram Frank

United States Patent Office 3,400,543
Patented Sept. 10, 1968

3,400,543

SEMI-CONDUCTOR COOLING MEANS

Peter G. Ross, 460 Shannon Place,
Cliffside Park, N.J. 07010

Filed Oct. 31, 1966, Ser. No. 590,812
5 Claims. (Cl. 62—3)

ABSTRACT OF THE DISCLOSURE

The present invention relates to a transistor cooling means and basically utilizes a fluid injection system to cool the base member of the transistor. A coolant fluid source and circulator pump conveys fluid through a plurality of tubes to bases of a bank of transistors and thereby circulates the fluid to cool the transistor. Alternative arrangements for providing a jacket around the transistor elements is also provided having a similar fluid conduction and circulating means. A further alternative arrangement embodies the use of dissimilar elements and their interaction to create a cooling surface within or adjacent to the semi-conductor elements within the transistor.

The present invention relates to a cooling means and more particularly to a cooling apparatus for the removal of heat from high power diodes.

Heretofore, high powered silicone diodes were normally mounted on heat-sink blocks. The heat generated by the high powered silicone diodes was absorbed by the heat-sink block and in this manner, by cooling the block itself, the heat was removed from the area in which the diodes were singularly mounted.

The use of this method of dissipating large amounts of heat is the well known and accepted manner of heat dissipation used in conjunction with high powered semi-conductor devices.

The industry has long recognized that in order to adequately heat-sink a bank of silicone diodes, for example, large areas of space were required so that the silicone diodes might be mounted in spaced relationship to each other on a heat-sink block. The blocks themselves were generally large surface areas and were made from heavy metallic material. Aside from requiring a large area for dissipating the heat, this particular means of heat dissipation was found to be extremely expensive since high quality metals were generally used as a heat-sink and the space required for the proper heat dissipation, of necessity, reduced the available space for components adjacent to the heat-sink block.

Needless to say, a heat dissipation means of this nature was extremely cumbersome and further, because of the great amount of heat to be dissipated, hot spots were developed within the equipment itself. It is well known in the electronics industry, or any industry wherein high powered transistor circuitry is utilized, that hot spots and high heat concentrations result in the unstable operation of the electrical or electronic equipment. The unstable operation of equipment further resulted in expensive shut down time, as well as extremely high repair bills.

Further, when diodes, of the high powered silicone type, are being used, the heat generated through their use caused the internal resistance in the diode itself to rise extremely high so that the diode acted, that is its characteristics, resembled that of a resistor. The concomitant loss of conductivity of the transistor, of necessity, causes a drastic change in the operation of the circuitry to which it was associated, thereby causing a further breakdown of the associated circuitry. On many occasions the high ambient temperature caused the silicone diodes to react with thermal runaway which situation was extremely detrimental to the life of the diode as well as the life of the associated circuitry.

It is well known that by utilizing the heat-sink block the sink merely cooled the base portion of the transistor which is below the "molly" chip, and therefore the body of the transistor is not cooled. Generally the heat generated is transferred through the base portion of the diode which temporarily contributes to an increase in the base heat of the diode and the jacket thereof gets even hotter than normal. Here again, breakdown and shutdown of the associated circuitry has been known to be commonplace as a result of the inefficient utilization of the heat-sink method.

It is the object of the present invention to avoid and overcome the difficulties known in the prior art by the provision of a cooling means which will be economic to use and which is easily manufactured.

Another object of the present invention is to provide a semi-conductor cooling means which may operate independently of associated circuitry.

A further object of the present invention is to provide a semi-conductor cooling device which will dissipate the heat generated by high powered semi-conductors thereby permitting continued use over a long period of time and without changing the characteristics of the semi-conductor.

Still another object of the present invention is to provide a semi-conductor cooling device which will cool the entire semi-conductor jacket and dissipate the high heat generated therein without changing the circuitry associated with the semi-conductors.

Still a further object of the present invention is to provide a semi-conducted cooling device which will cool the semi-conductors with a fluid and provide for power ratings higher than normally expected.

A further object of the present invention is to provide a self-cooling semi-conductor.

The objects of the present invention have been achieved by providing a semi-conductor cooling device comprising a semi-conductor provided with a jacket in communication with a fluid injection means, a coolant source connected to said fluid injection means, a dispensing tube disposed between said fluid coolant source and said fluid injection means and means for circulating a coolant.

For a better understanding of the present invention reference should be had to the accompanying drawings, wherein like numerals of reference indicate similar parts throughout the several views and wherein.

Although the principles of the present invention are broadly applicable to high powered semi-conductors the present invention is particularly adapted for use in conjunction with silicone diodes and hence it has been so illustrated and will be so described.

Figures 1, 2, 3:
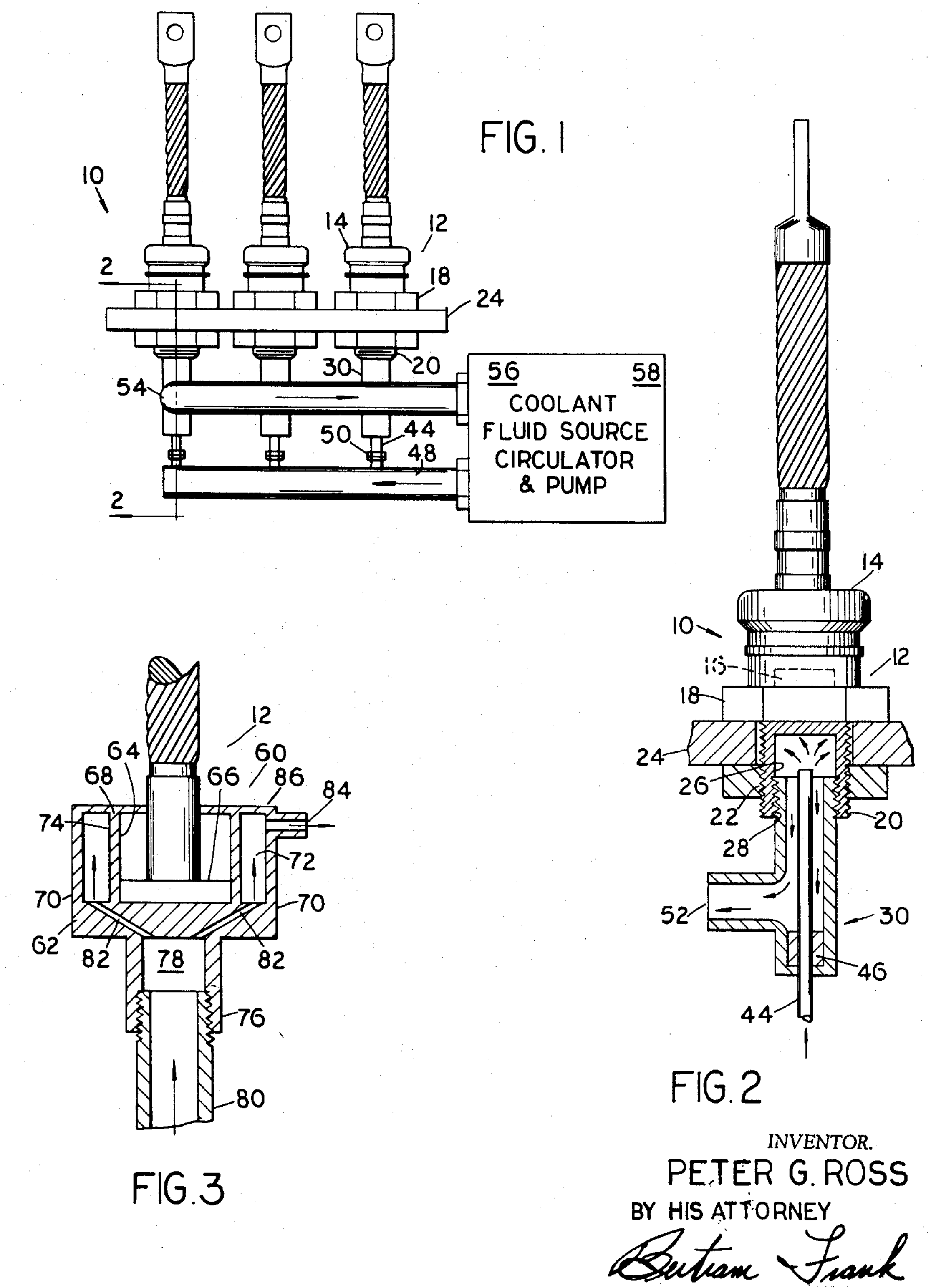
FIGURE 1 is a pictorial representation of a bank of semi-conductors utilizing the present invention.
FIGURE 2 is a partial cross sectional view of the semi-conductor and stud arrangement.
FIGURE 3 is a cross sectional representation of an alternative embodiment of a semi-conductor and cooling means arrangement.

With specific reference to the form of the present invention illustrated in the drawings, and referring particularly to FIGURE 2, a cooled semi-conductor is generally indicated by the reference numeral 10.

It should be noted, that the foregoing description will be based on the use of an International Rectifier semi-conductor code number 1N2054, and the drawings illustrating the invention are based on the structural configuration of this semi-conductor. It will further be noted that although this specific semi-conductor is so described and illustrated as forming part of the invention, it is particularly understood that the present invention is adaptable to many and varied types of high powered transistors and semi-conductors, therefore the present invention is not limited to the conjunctive use of this particular semi-conductor.

As shown in FIGURE 2, the silicone diode 12 may be provided with a jacket 14 around a semi-conductor material 16, the jacket 14 being mounted on a base portion 18. In order to hold the transistor 12 in position on a frame a stud portion 20 is provided and is fixedly mounted to the base portion 18 and projects downwardly therefrom. The stud member 20 may be provided with a threaded exterior surface 22 to accommodate a lock nut (not shown) so that the transistor 14 may be mounted on a plate 24. In prior art practices this plate may have been considered the heat-sink.

The stud member 20 may be provided with an over sized internal bore 26 and may further be provided with an internal thread 28.

In order to introduce a cooling fluid to the base 18 of the transistor 12 a fluid injection means 30 may be provided such that it may be threadedly mounted into the stud portion 20 of the transistor 12. As shown in FIGURE 2, the fluid injection means 30 may take the form of a T-shaped member having threaded portions 32 on its upper end 34 and a threaded portion 36 on its lower end 38. The laterally extending end 40 may also be provided with a threaded portion 42. As shown in FIGURE 2, a fluid injection tube 44 may extend interiorly through the fluid injection means 30 and extend from the lower end 38 to the position slightly beneath the upper end 34. The fluid injection means 30, may be generally hollow, however a plug arrangement 46 may be provided around the fluid injection tube 44 in the lower end 38 thereof so that fluid may not be permitted to flow therefrom.

Operationally a fluid dispensing tube 48 may be connected to the fluid injection tube 44 by means of a convenient coupling arrangement 50 and may introduce fluid into the fluid injection means 30 such that the fluid entering the fluid injection tube 44 may be injected thereinto and may circulate to cool the base portion 18 of the transistor 12. Thereafter the circulated fluid may be ejected through the lateral opening 52 in the laterally extending end 40 of the fluid injection means 30. In this manner fluid injected into the fluid injection means 30 may be permitted to circulate within the stud 20 of the transistor 12, thereby cooling the base portion 18, and after circulation may be rejected or ejected through the lateral opening 52 to a fluid return means 54. A coolant fluid source 56 and circulator 58 may be respectively connected to the fluid dispensing tube 48 and to the fluid return means 54 so that the fluid communicating with the base 18 of the transistor 12 may be circulated and recooled and again recirculated through the transistor 12. In this manner it may be seen that the transistor base 18 which generates and dissipates a portion of the heat emanating from the transistor 12 will be cooled directly by the circulating fluid in the fluid injection means 30 by means of its connection to the stud 20.

Alternatively, a transistor or semi-conductor 60 may be cooled not only at its base portion 62 but around the entire periphery 64 of the semi-conductor material 66 used internally of the jacket 68 of the transistor 60. Structurally, as shown in FIGURE 3 the normal internal structure of the semi-conductor 60 may take its well known form however, the jacket 68 of the semi-conductor 60 may have provided therearound an outer shell 70 which is totally enclosed and yet is provided with a chamber 72 around the outer periphery 74 of the jacket 68 of the semi-conductor 60. The stud portion 76 of the semi-conductor 60 may be provided with a hollowed out portion 78, as previously described, and may have insertible therein a fluid injection means 80 connectible to the stud portion 76. The means of connecting the fluid injection means 80 into the stud portion 76 may take any convenient means well known to those skilled in the art. A plurality of channels 82 may be provided in the base portion 62 of the semi-conductor 60 such that they may communicate between the hollowed out stud portion 78 and the chamber 72 which encircles the jacket 68 of the semi-conductor 60.

With this construction coolant fluid entering into the stud portion 74 of the semi-conductor 60 through the fluid injection means 80 may be forced into the chamber 72 encircling the semi-conductor jacket 68 and may circulate therearound to cool, entirely, not only the base portion 62 of the semi-conductor 60, but also the jacket 68 thereof.

In order to remove the coolant fluid from the chamber 72 surrounding the semi-conductor 60, an ejection orifice 84 may be provided at the upper end 86 of the outer shell 70 thereby permitting the coolant fluid, which has circulated around the body or jacket 68 of the transistor 60, in the chamber 72, to be rejected through the ejection orifice 84 to a recirculating conduit so that the coolant fluid may thereafter be recirculated through a recirculatory device (not shown) back to the transistor 60. In this alternative embodiment hereinabove described, it may be seen that the coolant fluid will circulate to cool the base portion 62 of the transistor or semi-conductor 60 and may circulate around the jacket 68 of the semi-conductor 60 thereby removing any heat buildup from the transistor and thereafter the coolant fluid which, after circulation around the semi-conductor 60 has been heated by the heat of the unit, may thereafter pass through the ejection orifice 84 back to the recirculation device and then recirculated through the transistor 60, at a lower temperature.

This construction as well as the transistor construction of FIGURE 2 may lend itself to a bank of transistors to be cooled as shown in FIGURE 1. Because of the more extensive travel of the coolant fluid, not only to the base 62 of the semi-conductor 60, but also around the body thereof. This extended excursion of the coolant fluid will not decrease its effectiveness in cooling the transistor and therefore this means of cooling the entire semi-conductor 60 is as effective as the mere cooling of the base alone. In fact, it is a much more effective means of cooling the semi-conductor 60 because the entire semi-conductor is exposed to the coolant fluid, not merely one portion thereof.

It is known to those skilled in the art that a particular class of thermoelectric materials when subjected to a high current flow therethrough will exhibit certain properties such as cooling on one surface and heating on another surface.

Figure 6:
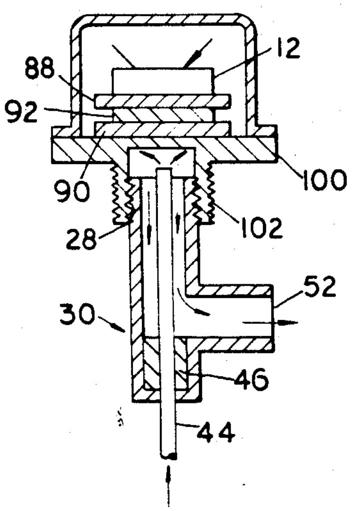
FIGURE 6 is a cross sectional view of a cooled semi-conductor and base portion.
Figure 7:
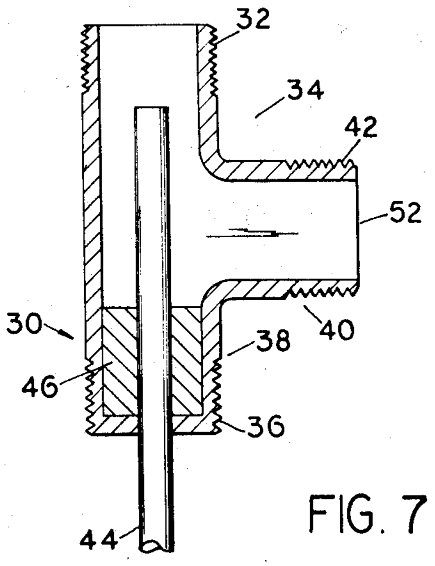
FIGURE 7 is a cross sectional view of fluid injection means.

This phenomena appears generally at the junction of dissimilar metals when an electrical current is passed through the junction. Therefore it may be seen that by providing a sandwich-like structure of particularly chosen metals, and by inducing an electrical current flow through this structure a cooled surface and heated surface may be obtained. This principle, of a resulting cooled surface and heated surface, from a flow of electrical current through a prescribed material is known as the "Peltier" effect. Although varying types of metals may be used the use of bismuth or antamony "doped" with telleride may be considered as preferable sandwiched between well known temperature conducting materials such as coppex. Utilizing this principle it may be seen therefore, that, as shown in FIGURE 6, the internal portion of a transistor or semi-conductor may be mounted on a first piece of material 88. A second material 90 may be provided in spaced relationship with the first material 88 and further being provided with a piece of thermoelectric material 92 such as the telleride doped bismuth or antamony disposed therebetween. Such sandwich-like structure may generally be hereinafter referred to as the cooling means 94.

A current source is provided and is in communication with the cooling means 94 such that when current flows therethrough the upper surface 96 of the thermoelectric material 92, which is in communication with the first piece of material 88, upon which the semi-conductor elements are mounted, is cooled and the second material 90 disposed on the lower portion of the thermoelectric material 92 will be heated in accordance with the Peltier principle. With this particular structure, it may be seen that the current flowing through the thermoelectric material 92 will cool the upper material 88 in communication with the semi-conductor internal workings thereby cooling the same and maintaining a relatively constant temperature at the transistor or semi-conductor inner structure. Simultaneously the second material 90, which is in communication with the bottom surface 98 of the thermoelectric material 92 is being heated in accordance with the Peltier principle.

Figure 4:
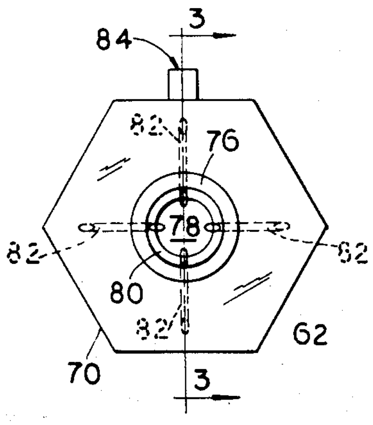
FIGURE 4 is a bottom plan view of the base portion of the alternative embodiment.
Figure 5:
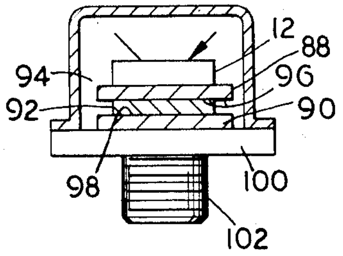
FIGURE 5 is a cross sectional view of another embodiment of a cooled semi-conductor.

In order to remove the heat build-up at the base 100 of the transistor which is the result of the accumulation of heat on the second material 90, the stud portion 102 thereof may be provided with a similar structure disclosed in FIGURES 3 and 4 whereby a coolant fluid material is injected into the stud 102 to cool the lower base portion 100 of the transistor. In this particular embodiment the Peltier principle is being utilized to cool the inner workings of the semi-conductor and the circulating coolant fluid is utilized to remove any heat build-up in the base portion 100 of the semi-conductor thereby maintaining a completely cooled semi-conductor device throughout its operation.

Alternatively, the principle described in conjunction with FIGURE 4 may be utilized to cool the lower portion and upper portion of the semi-conductor which is provided with a plurality of compartments into which coolant fluid may be injected and removed and recirculated through a circulation system to be reinjected into the transistor or semi-conductor for the purposes of cooling even though the internal workings or portions of the internal workings of the semi-conductor may be cooled by utilizing the Peltier principle as hereinabove applied. It therefore may be seen that various combinations of the application as herein described above using the Peltier principle in conjunction with the fluid injection and cooling arrangement may be combined to create a high powered semi-conductor completely cooled mechanism which will permit a semi-conductor to operate under ideal temperature conditions thereby promoting the life of the semi-conductor and eliminating many of the most undesirable features presently found in the high powered semi-conductor units.

I claim:

1. Means for cooling a semiconductor comprising a semi-conductor, a housing for said semi-conductor, said housing comprising a base portion, a stud mounted on one side of said base portion and having an internal bore, a jacket mounted on the other side of said base portion, said semi-conductor mounted on said base portion within said jacket, an outer shell mounted on said base portion in spaced relationship with said jacket to form an enclosed chamber around said jacket, said enclosed chamber having an ejection orifice, a plurality of channels in said base portion communicating between said internal bore and said enclosed chamber, fluid injection means communicating with said internal bore, fluid ejection means communicating with said ejection orifice, a coolant source and circulation means in communication with said fluid injection and ejection means.

2. Means for cooling a semi-conductor according to claim 1 wherein a said plurality of channels are provided in said base portion, said channels communicating between the internal bore of said stud portion and said enclosed chamber whereby fluid injected into said stud portion will be introduced into said chamber.

3. Means for cooling a semiconductor according to claim 2 wherein said fluid injection means comprises a hollow tube being connectable to a source of coolant fluid.

4. Means for cooling a semi-conductor according to claim 1 wherein said semi-conductor is provided with semi-conductor material disposed therein, cooling means disposed beneath said semi-conductor material, and means for electrically exciting said cooling means.

5. Means for cooling a semi-conductor according to claim 4 wherein said cooling means comprises a first piece of electrically conductive material, a thermo-electric material having two contact surfaces, said first piece of electrically conductive material contiguous with one contact surface of said thermo-electric material, and a second electrically conductive material contiguous with the second contact surface of said thermo-electric material.

References Cited

UNITED STATES PATENTS

| | | | |
|---|---|---|---|
| 2,507,636 | 5/1950 | Kistler | 174—15 X |
| 2,725,505 | 11/1955 | Webster et al. | 317—235 |
| 2,777,975 | 1/1957 | Aigrain | 317—234 |
| 2,930,904 | 3/1960 | Fritts | 317—234 X |
| 2,994,203 | 8/1961 | Lackey et al. | 174—15 X |
| 3,013,191 | 12/1961 | Connell | 317—234 |
| 3,017,522 | 1/1962 | Lubcke | 317—235 X |
| 3,098,165 | 7/1963 | Zitelli | 313—21 |
| 3,227,904 | 1/1966 | Levin | 313—21 |

FOREIGN PATENTS

| | | |
|---|---|---|
| 851,047 | 10/1960 | Great Britain. |
| 872,894 | 7/1961 | Great Britain. |
| 887,568 | 1/1962 | Great Britain. |
| 953,339 | 3/1964 | Great Britain. |

ROBERT A. O'LEARY, *Primary Examiner.*

A. W. DAVIS, *Assistant Examiner.*